(12) United States Patent
Li

(10) Patent No.: US 9,751,763 B2
(45) Date of Patent: Sep. 5, 2017

(54) MATERIAL AND APPLICATIONS THEREFOR

(75) Inventor: Dan Li, Victoria (AU)

(73) Assignee: MONASH UNIVERSITY, Victoria (AU)

( * ) Notice: Subject to any disclaimer, the term of this patent is extended or adjusted under 35 U.S.C. 154(b) by 533 days.

(21) Appl. No.: 13/810,051

(22) PCT Filed: Apr. 6, 2011

(86) PCT No.: PCT/AU2011/000393
§ 371 (c)(1),
(2), (4) Date: Apr. 1, 2013

(87) PCT Pub. No.: WO2012/006657
PCT Pub. Date: Jan. 19, 2012

(65) Prior Publication Data
US 2013/0180912 A1    Jul. 18, 2013

Related U.S. Application Data

(60) Provisional application No. 61/364,049, filed on Jul. 14, 2010.

(51) Int. Cl.
*B01D 67/00* (2006.01)
*B01D 69/10* (2006.01)
(Continued)

(52) U.S. Cl.
CPC .......... *C01B 31/00* (2013.01); *B01D 67/0079* (2013.01); *B01D 69/10* (2013.01);
(Continued)

(58) Field of Classification Search
CPC ..... C01B 31/00; C01B 31/04; C01B 31/0407; C01B 31/0438; C01B 31/0446; C01B 31/0484; C01B 31/0492; B01J 13/00; B01J 13/0052; B01J 13/0056; B01J 21/18; B01J 21/185; B01D 61/027; B01D 67/0009; B01D 67/0079; B01D 69/10; B01D 69/48; B01D 71/021; B01D 2325/02;
(Continued)

(56) References Cited

U.S. PATENT DOCUMENTS 7,939,218 B2 *   5/2011   Niu ............................... 429/532
2008/0149566 A1 *  6/2008   Messersmith et al. ....... 210/702
(Continued)

FOREIGN PATENT DOCUMENTS

WO   WO 2009/023051 A1   2/2009
WO   WO 2009/049375 A1   4/2009

OTHER PUBLICATIONS

International Search Report dated May 24, 2011, in PCT/AU2011/000393.
(Continued)

*Primary Examiner* — Joseph Drodge
(74) *Attorney, Agent, or Firm* — Oblon, McClelland, Maier & Neustadt, L.L.P.

(57) ABSTRACT

A gel film or an isolated gel film comprising sheets of graphene or chemically converted graphene at least partially separated by a dispersion medium, such as water, and arranged in a substantially planar manner to form an electrically conductive matrix.

28 Claims, 9 Drawing Sheets

(51) Int. Cl.
*B01D 71/02* (2006.01)
*B01J 21/18* (2006.01)
*H01G 11/36* (2013.01)
*H01M 4/86* (2006.01)
*H01M 8/02* (2016.01)
*B32B 9/00* (2006.01)
*C01B 31/00* (2006.01)
*B01D 69/14* (2006.01)
*B01J 13/00* (2006.01)
*B82Y 30/00* (2011.01)
*H01M 4/96* (2006.01)
*H01M 8/0234* (2016.01)
*B01D 61/02* (2006.01)
*H01M 4/02* (2006.01)

(52) U.S. Cl.
CPC ......... B01D 69/148 (2013.01); B01D 71/021 (2013.01); B01J 13/0052 (2013.01); B01J 21/185 (2013.01); B32B 9/007 (2013.01); B82Y 30/00 (2013.01); H01G 11/36 (2013.01); H01M 4/96 (2013.01); H01M 8/0234 (2013.01); *B01D 61/027* (2013.01); *B01D 67/0009* (2013.01); *B01D 2323/08* (2013.01); *B01D 2325/02* (2013.01); *B01D 2325/10* (2013.01); *B01D 2325/24* (2013.01); *B01D 2325/26* (2013.01); *H01M 4/8626* (2013.01); *H01M 2004/023* (2013.01); *Y02E 60/13* (2013.01); *Y10T 428/249921* (2015.04)

(58) Field of Classification Search
CPC ............ B01D 2325/10; B01D 2325/24; B01D 2325/26; B82Y 30/00; H01G 11/32; H01G 11/36; H01M 8/0234; H01M 8/024; H01M 8/0241; H01M 8/0245; H01M 4/8626; H01M 4/96; H01M 2004/023; B32B 2307/20; B32B 2307/202; B32B 2313/04; B32B 2457/10; B32B 2457/18; B32B 7/045; B32B 9/00; B32B 9/005; B32B 9/007; B32B 18/00

USPC ........ 423/445, 445 R, 445 B, 448, 460, 461; 210/500.21; 174/125.1; 264/105; 427/122; 505/150
See application file for complete search history.

(56) References Cited

U.S. PATENT DOCUMENTS

| | | | |
|---|---|---|---|
| 2009/0117467 A1* | 5/2009 | Zhamu | H01M 4/133 429/231.8 |
| 2010/0028681 A1* | 2/2010 | Dai et al. | 428/408 |
| 2010/0105834 A1* | 4/2010 | Tour et al. | 525/50 |
| 2010/0301279 A1* | 12/2010 | Nesper et al. | 252/502 |
| 2010/0303706 A1* | 12/2010 | Wallace et al. | 423/445 B |
| 2010/0323178 A1* | 12/2010 | Ruoff et al. | 428/220 |
| 2011/0051316 A1* | 3/2011 | Liu et al. | 361/502 |
| 2011/0189452 A1* | 8/2011 | Lettow | B05D 3/10 428/220 |

OTHER PUBLICATIONS

Dan Li, et al., "Processable aqueous dispersions of graphene nanosheets", Nature Nanotechnology, vol. 3, Feb. 2008, pp. 101-105.

Byung-Seon Kong, et al., "Layer-by-layer assembly of graphene and gold nanoparticles by vacuum filtration and spontaneous reduction of gold ions". Chem. Commun., 2009, pp. 2174-2176.

Yanwu Zhu, et al., "Exfoliation of Graphite Oxide in Propylene Carbonate and Thermal Reduction of the Resulting Graphene Oxide Platelets", ACS Nano, vol. 4, No. 2, 2010, pp. 1227-1233.

Supplementary European Search Report dated Aug. 4, 2016 in Patent Application No. 11806125.8.

Shu Jun Wang, et al. "Fabrication of Highly Conducting and Transparent Graphene Films", Carbon, vol. 48, No. 6, XP026926488, 2010, pp. 1815-1823.

Yao Chen, et al. "Stable Dispersions of Graphene and Highly Conducting Graphene Films: A New Approach to Creating Colloids of Graphene Monolayers", Chemical Communications, This Journal is the Royal Society of Chemistry 2009, No. 30, XP55216684, 2009, pp. 4527-4529.

Dmitriy A. Dikin, et al., "Preparation and Characterization of Graphene Oxide Paper", Nature Publishing Group, vol. 448, No. 7152, Jul. 26, 2007, XP55163610, pp. 457-460.

* cited by examiner

MATERIAL AND APPLICATIONS THEREFOR

CROSS-REFERENCE TO RELATED APPLICATIONS

This application is a National Stage of PCT/AU2011/000393 filed Jun. 4, 2011. This application is based upon and claims the benefit of priority from U.S. Provisional Application No. 61/364,049 filed Jul. 14, 2010.

FIELD OF THE INVENTION

The present invention relates to a graphene based material, to methods for its production and to applications therefor. More specifically, the invention relates to a graphene gel, preferably a hydrogel, which may for example be used, in energy storage or conversion devices such as supercapacitors, batteries, fuel cells, solar cells and actuators, as building blocks for high performance composite materials, in sensors, biomedical and diagnostic devices, separation membranes and controlled drug release devices.

BACKGROUND

Graphene is an aromatic conducting polymer comprising a monolayer of $sp^2$-bonded carbon atoms in a planar honeycomb network. Due to its properties of electrical and thermal conductivity, mechanical strength and rigidity, chemical stability and high specific surface area the graphene polymer holds great promise in many technological fields, such as nanoelectronics, sensors, separation/filtration, nanocomposites, batteries, supercapacitors and hydrogen storage. However, an efficient approach to producing processable graphene sheets in large quantities has been a major obstacle to successful commercial development.

Like carbon nanotubes and many other nanomaterials, a key challenge in the synthesis and processing of bulk-quantity graphene sheets is aggregation. In view of their high specific surface area, and unless well separated from each other, graphene sheets tend to form irreversible agglomerates or may even restack to form graphite, as a result of van der Waals interactions. This problem has been encountered in previous efforts aimed at large-scale production of graphene through chemical conversion or thermal expansion/reduction. The prevention of aggregation is of particular importance for graphene sheets because many of their unique properties are only associated with the non-aggregated form of the material.

Aggregation can be reduced by the attachment of other molecules or polymers onto the sheets. However, the presence of foreign stabilisers is undesirable for many applications. In particular, other molecules or polymers can block a portion of surface area of graphene and may decrease electrical conductivity.

Accordingly, there exists a need for a new or improved graphene-based material in which the graphene sheets are separated but stable, so the properties of the individual graphene sheets can be effectively harnessed.

Uniform graphene paper films have been formed on a membrane filter by vacuum filtration of as-reduced dispersions. Free-standing graphene paper can be peeled off from the membrane filter and is bendable with a shiny metallic lustre. The conductivity of graphene paper is found to be about 7200 S/m at room temperature, which is comparable to that of chemically modified single-walled carbon nanotube paper.

Filtration is an efficient technique for making macroscopic assemblies from a suspension of solid particles. Filtration has been widely used for manufacturing writing paper since ancient times and more recently has been used in the fabrication of carbon nanotube and graphene-based papers. Nevertheless, only dried paper products have been targeted by the filtration methods and little attention has been paid to the formation mechanism of graphene paper.

The present inventor has now identified a gel film at the interface of a filter membrane and a liquid dispersion of graphene sheets being filtered. When the liquid is water, the gel film formed is a hydrogel. The inventor has furthermore determined that the gel film produced possesses a number of advantageous and unexpected properties, such as mechanical strength and electrical conductivity. The gel film also has an open pore structure with a highly accessible surface area of individual graphene sheets, which is improved in comparison to the properties of dried graphene paper.

The gel film according to the invention comprises graphene sheets that are arranged in a substantially planar manner, and can be distinguished in this way from known three-dimensional (3D) gels in which the graphene sheets are disposed in random orientation (or plane) relative to one another. Most gels are 3D polymeric networks containing large quantities of a liquid, such as water, but which behave like a solid due to the cross-linked network of polymer within the liquid. Graphene sheets have been reported to form a 3D gel in water if the concentration of a dispersion exceeds a critical value (i.e. 0.5 mg/ml). The resultant 3D hydrogel comprises a highly porous, randomly cross-linked 3D network of graphene sheets. However, the 3D hydrogel formed in solution is fragile, which limits its practical commercial use. A 3D hydrogel has also been reported by Xu et al in a journal article entitled: Self-assembled graphene hydrogel via a one-step hydrothermal process (ACS Nano (2010) 4 (7) pp 4324-4330). The 3D gel was prepared by hydrothermal reduction of a homogenous aqueous dispersion of graphene oxide (0.5 to 2 mg/ml) in an autoclave at 180° C. for 1 to 12 hours. The resultant 3D hydrogel comprises a network of graphene sheets with a poor ordering along their stacking direction. Due to the fact that the sheets are three-dimensionally restricted and that the graphene itself is rigid, the 3D hydrogel is not as mechanical flexible, pH responsive or as conductive as a gel comprising graphene sheets arranged in a substantially planar manner. A gel comprising graphene sheets arranged in a substantially planar manner can also be formed into thinner film than 3D gels which makes them easier to integrate into some devices.

SUMMARY OF THE INVENTION

According to a first aspect of the invention there is provided a gel film comprising sheets of graphene or chemically converted graphene at least partially separated by a dispersion medium and arranged in a substantially planar manner to form an electrically conductive matrix.

It has now been found that graphene sheets can exhibit a gelation behaviour in liquid that can be controlled to result in a conductive gel film. The liquid used to form the gel can be an organic liquid in which case the gel is an organogel. Alternatively, the liquid used to form the gel is water (or a substantially aqueous solvent) resulting in a hydrogel.

In some embodiments, the conductive gel film is isolated from surrounding liquid(s) and/or solid(s). Thus, the invention also provides an isolated gel film comprising sheets of graphene or chemically converted graphene at least partially separated by a dispersion medium and arranged in a substantially planar manner to form an electrically conductive matrix.

The gel of the invention can be prepared by any method that results in a structure in which the graphene sheets are at least partially separated by a dispersion medium and are arranged in a substantially planar manner to form an electrically conductive matrix. A preferred method comprises allowing the graphene sheets to self-assemble or self-orientate into the substantially planar manner under controlled conditions. The controlled conditions are those which facilitate the formation of the gel structure of the first aspect of the invention.

According to another aspect of the invention, there is provided a method of producing a gel film comprising sheets of graphene or chemically converted graphene at least partially separated by a dispersion medium and arranged in a substantially planar manner to form an electrically conductive matrix, the method comprising the steps of:
  contacting a surface with a dispersion medium comprising sheets of graphene or chemically converted graphene dispersed therein;
  removing some of the dispersion medium from the surface and allowing the sheets to self-assemble to form a gel film on the surface.

In one embodiment the method further comprises the step of:
  increasing the temperature of the dispersion medium comprising the sheets of graphene or chemically converted graphene dispersed therein;
  wherein the temperature is increased to control the resultant inter-sheet spacing in the gel film that forms on the surface.

The increased temperature is thought to have an effect on the intrinsic corrugation of the graphene sheets. The higher the temperature the more corrugated each graphene sheet will be, thereby resulting in a larger inter-sheet spacing or separation. A larger inter-sheet spacing will result in a more porous gel film. The larger the inter-sheet spacing, the more permeable the gel film is to liquid, i.e. the greater the flux of the film. By "porous" or "permeable" it is meant that there is a network of channels or pores between the graphene sheets in the film. The channels or pores provide a passage for liquids and/or solids to pass from one side of the gel film, through and out of the opposite side of the gel film. By controlling the permeability/porosity, the gel film can have use as a selective filtration membrane, e.g. a nanofiltration membrane.

In one embodiment, the temperature of the dispersion medium comprising the sheets of graphene or chemically converted graphene dispersed therein is increased before contacting the surface with the liquid. Advantageously, the temperature is increased above about 80° C., such as 90° C., 100° C., 120° C. or 150° C.

The invention also provides a filtration membrane when produced by the method of the invention.

In one embodiment, the method further includes the step of applying a conductive layer onto the surface before contacting it with the dispersion medium comprising graphene or chemically converted graphene dispersed therein.

For some uses, the gel film can be used on the surface of the substrate on which it formed. Alternatively, the gel film can be separated from the surface.

In one embodiment, the surface is a filter and dispersion medium is removed from the surface by passage through the filter, preferably under a vacuum.

BRIEF DESCRIPTION OF THE FIGURES

Preferred embodiments of the invention will now be described with reference to the following Figures, which are intended to be exemplary only, and in which.

DESCRIPTION OF PREFERRED EMBODIMENTS OF THE INVENTION

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The present invention is described herein by way of example only. It is to be understood that modifications or alterations to the invention that would be obvious to a person skilled in the art based upon the detailed disclosures provided herein are considered to fall within the scope and spirit of the invention.

Figure 1:
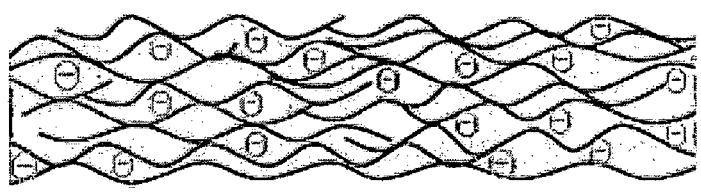
FIG. 1 is a schematic diagram of a portion of a gel film.
Figure 2:
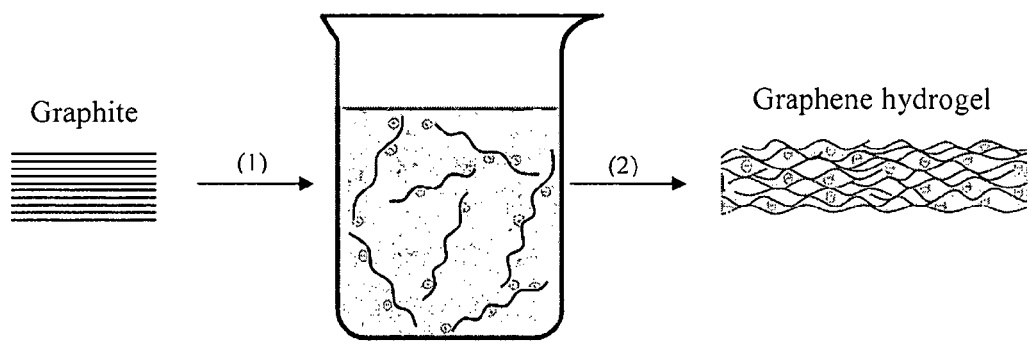
FIG. 2 is a schematic diagram showing how graphite can be converted to an oriented graphene gel film. Graphene can be suspended in water as individual negatively charged sheets by a sequence of chemical/physical treatments (oxidation, exfoliation to graphene oxide and chemical deoxygenation) (Step 1). The well-dispersed, corrugated graphene sheets can then be subjected to vacuum filtration, which causes them to assemble into an oriented graphene gel (Step 2)

In one aspect, the invention provides a gel film comprising graphene or chemically converted graphene (CCG) sheets. FIG. 1 is a schematic diagram of the gel film according to the invention. In the diagram graphene or (CCG) sheets are shown at least partially separated by dispersion medium. Together the sheets (as they will be collectively be referred to throughout) form an electrically conductive interconnected matrix. In this context the term "interconnected" does not necessarily imply a physical connection or contact between adjacent sheets, although there is at least electrical connectivity between adjacent sheets such that electron communication between adjacent sheets is enabled. In some instances there may be physical contact between adjacent sheets, which is facilitated or assisted by the usually corrugated character of the sheets.

In the gel film of the invention, the sheets are at least partially separated from one another. The spacing between the sheets can form a network of channels or open pores which provide passages from one side of the gel film to the opposite side. That is the sheets are not completely close stacked such that adjacent sheets are in full physical contact. The interlayer spacing of graphene sheets in gel films that have been freeze dried for study has been found to be in the range of from about 0.37 nm to 0.40 nm, such as 0.38 nm to 0.39 nm. While there may be some direct physical contact between adjacent sheets, there is significant separation of sheets by interspersed dispersion medium. Despite the interconnection between sheets the sheets behave chemically and physically like graphene (or modified graphene) rather than graphite. Spaces between sheets are accommodated by the dispersing medium, but may also included other components or agents either added during production of the gels or added later. While the dispersion medium will take the form of a liquid during production of the gel it is possible under certain circumstances that the dispersion medium is in a solid or semi-solid form, such as for example, if the gel has been exposed to freezing.

As can also be seen in FIG. 1, the sheets are arranged in a substantially planar manner to form a matrix. The sheets within the gel are stacked together to form a layered overlapping structure or matrix that is electrically conductive and chemically stable. By the term "substantially planar" it is not intended to convey that the sheets are flat—indeed, as noted below, it is likely in many cases that at a molecular level the sheets will have a corrugated or undulating configuration. By the term "substantially planar" it is meant that the vast majority of the sheets within the gel are generally located within the same plan or within substantially parallel planes. For example, in preferred embodiments at least 60%, at least 70%, at least 80%, at least 90%, at least 95%, at least 98%, and least 99% and preferably at least 99.9% of the sheets within the gel will be angled along their major axes at less than about 45°, 35°, 15°, preferably no more than about 10°, 7°, 5°, 3°, or 1° relative to adjacent sheets.

The finding that graphene or CCG can be formed into a stable gel in which the sheets are arranged in a substantially planar manner is contrary to expectations. Prior to the present invention the conventional view was that face-to-face oriented graphene or CCG sheets would collapse and restack to form a graphite-like material due to inter-sheet π-π attractions. Without wishing to be bound by theory the present inventor postulate that a combination of the intrinsic corrugation of the sheets, their high stiffness and optional chemical functionality can account for the formation of the gel structures of the invention. In some embodiments, the amplitude of the corrugation is in the range of from about 1, 2, 3, 5, 8, 10, 13, 15, 18 or 20 nm. The amplitude of corrugation can be controlled as described in more detail below.

As noted above, graphene is an aromatic conducting polymer comprising a monolayer of $sp^2$-bonded carbon atoms in a planar honeycomb network. Graphene is commercially-available and can be produced by mechanical exfoliation from bulk graphite, which is essentially a laminate of graphene layers. However, another approach for obtaining a graphene-like material is via exposing graphite to harsh oxidation conditions to produce a graphite oxide material, which can then be converted to CCG by reduction, for example with hydrazine or borohydride or by hydrothermal treatment. Although similar to graphene, CCG will have some differing properties to graphene as a result of defects caused by the oxidation conditions used to produce graphite oxide and because the subsequent reduction step will not fully remove oxygen containing functional groups (such as carboxylic acid, ketone, ether and alcohol groups) that are characteristic of the graphite oxide structure. As graphite oxide is electrically insulating, it is preferable that it is largely converted back to a graphene-like form in the CCG utilised in the invention in order to restore the desirable graphene-like electronic properties of the sheets utilised.

The invention also includes within its scope gels formed from or comprising graphene-like sheets that may include some chemical functionalisation, as long as the overall gel material produced retains the desirable electrical conductivity character. Chemical modification or functionalisation of sheets used in the invention can be controlled to provide a desired conductivity or reactivity in the resultant gel. It is possible to use a mix of different graphene, CCG and/or other graphene-like sheets in forming the gels of the invention, as the use of such sheet materials will impart desirable properties upon the gels so produced. While it is advantageous for sheets in the gel film to comprise a single-atom thick layer of graphene or CCG, some of the sheets may comprise multi-layers, which are referred to as aggregates. The presence of aggregated sheets within the gels will decrease the sheet available surface area within the gel, which, depending upon the intended utility of the gel, may be undesirable. Preferably therefore, aggregated sheets are present at a relatively low level, such as less than about 10%, less than about 5%, less than about 2%, less than about 1% and preferably less than about 0.5% or less than about 0.1% of the total sheets present in the gel.

The gels of the invention are referred to as "films" as they generally take the form of a thin web of material. That is, the gel films generally extend further in their length and width dimensions than in thickness. The gels according to the invention will usually be formed on a surface or substrate such as a metal, glass, ceramic, composite material, paper or polymeric surface. The surface can be flat, curved, undulating or may have a defined shape that is intended to be imparted upon the gel. In that way the surface will act effectively as a mould to impart features of shape and configuration upon the gel. Although the gel may assume a shaped or moulded gross configuration, the sheets within the gel will nonetheless retain a substantially planar relationship with respect to one another, as outlined above. In preferred embodiments of the invention the surface upon which the gels are formed is porous and can act as a filter to allow for passage there through, and removal of, excess dispersion medium in the gel formation process.

Gels according to the invention may be retained for future storage, transport and/or use on the surface on which they are produced, or alternatively they may be isolated. By "isolated", it is meant that the gel film is substantially separated from a surface on which it is formed. Isolated or not, the gel film can be used in a device or in another application as described in more detail below.

The dispersion medium used to form the gel can be an organic or aqueous liquid, and in a preferred embodiment may consist of water. In embodiments in which the dispersion medium is an organic liquid, the gel produced will take the form of an organogel. For example, the organic liquid can be ethanol, methanol, toluene, ethylene glycol, DMF, THF. In other embodiments, the dispersion medium used to form the gel is water or a substantially aqueous liquid mixture or solution. When the liquid is waiter (or a substantially aqueous solution), the gel formed is a hydrogel. For convenience only, some of the following description relates to the properties of a hydrogel, although it should be understood that the invention is not so limited.

It should also be understood that the liquid dispersion medium may in addition to the sheets include other components or additives, which may impart desirable properties upon the gels so formed. For example the liquid may include solid particles or powders, such as of electrically conductive material such as manganese oxide, tin oxide, titanium oxide and/or nickel oxide, or semi-conductive material including semiconducting nanoparticles such as CdS, PdS, CdSe, or resistive material, magnetically active material, miniature electrical components or devices, carbon nanotubes, quantum dots, nanowires or other fine threads or fibres, ceramics, metals including metal nanoparticles such as Pt, Pd, Au, Ag, Sn, glass beads, composite materials, polymers such as such as polystyrene, poly(methyl methacrylate) or conducting polymers such as polyaniline, polypyrrole and polythiophenes), or may include colorants, pharmaceutically or veterinarily active agents, proteins, nucleic acids, nucleotides, amino acids, antibodies, fatty acids, lipids, carbohydrates, enzymes, liposomes, nutritional supplements, vitamins, pH buffers, salts, preservatives, anti-oxidants, contrast agents, fluorophores, phosphorescent agents or the like and any mixture of one or more of these.

The sheets utilised within the gels of the invention may take a wide variety of shapes and sizes. They may for example be of random shape and size or may be substantially uniform or of graded size and shape, depending upon the desired properties of the gel. For example the sheets may be substantially square, rectangular, circular, hexagonal, triangular or of undefined shape and may for example vary in size from about 50 $nm^2$ to 1 $mm^2$, such as from about 100 $nm^2$ to about 0.1 $mm^2$ or from about 1 $\mu m^2$ to about 50 $\mu m^2$.

For example the gels may comprise from about 0.1 $\mu g/cm^2$ to 1 $mg/cm^2$ of sheets (that is of graphene of CCG), such as from 1 $\mu g/cm^2$ to 500 $\mu g/cm^2$, or from 10 $\mu g/cm^2$ to 100 $\mu g/cm^2$. In one preferred embodiment of the invention there is about 45 $\mu g/cm^2$ of graphene or CCG in the gel.

The gel film preferably has a surface area of at least about 400 $m^2/g$, preferably at least about 500 $m^2/g$, 600 $m^2/g$, 800 $m^2/g$, 1000 $m^2/g$ or 1500 $m^2/g$.

The ordered inter-locking structure of the gel imparts exceptional structural stability. In preferred embodiments of the invention the gel film can retain its structural integrity in both acidic and basic solutions and in organic solvents as exemplified further below. The gel film can also retain its structural integrity in boiling water for example for at least 30 sec, 1 min, 5 mins or preferably for at least 10 mins, 30 mins or 1 hr. By "retain its structural integrity" it is meant that the gel has substantially the same substantially planar overlapping polymeric structure following exposure to the acid, base, solvent or temperature change to the structure before the exposure.

In some embodiments, the gel film can contain up to about 99 wt % dispersion medium. If the amount of liquid exceeds this, there is not enough structural integrity to maintain the gel structure. Preferably, there is at least about 95 wt %, or 92 wt % or 80 wt % of dispersion medium.

In one embodiment in which the dispersion medium is water, a hydrogel film containing 45 $\mu g/cm^2$ of graphene demonstrated a sheet electrical resistivity of 1,860Ω/☐ (Ω per unit). For comparison, an equivalent freeze-dried film (not in accordance with the invention) demonstrated electrical resistivity of 740Ω/☐. The high conductivity of the gel film of this embodiment of the invention is evidence that the graphene sheets in the hydrogel film are electrically connected with each other.

Like conventional ionic polymer gels, the volume of the gel film is responsive to pH and ionic concentration. The thickness of the gel film increases with pH. This is consistent with the fact that the ionisable groups of the sheets, such as carboxylic groups, become more ionised with increasing pH, resulting in greater inter-sheet electrostatic repulsions. The volume change of a 3D gel is found to be less than 3% when the pH is changed from 1 to 11. In comparison, in some embodiments, the present gel film has a volume change of up to 35% over a similar pH range. The addition of electrolytes suppresses electrostatic repulsion by screening the electrical double layer and the gel film does shrink upon exposure to more concentrated salt solutions, e.g. NaCl solutions. The volumetric response to pH and electrolyte occurs in the thickness direction of the film only, whilst the lateral dimension displays little response to environmental change. This result further confirms that the sheets are substantially oriented along the lateral direction; i.e. in a planar arrangement.

This unique anisotropic, responsive behaviour of the gels of the invention allows the gels to form reliable electrode contacts with external circuits, offering another advantage over conventional isotropic conductive 3D gels, which have problems in forming good electrical contacts due to their propensity to shrink/swell in all dimensions.

Despite being highly porous, the gel film exhibits exceptional structural stability and mechanical strength. For example, the tensile modulus of gels according to the invention may vary from about 30 MPa to 150 MPa, such as from about 50 MPa to about 100 MPa or from about 60 MPa to about 80 MPa. In one advantageous embodiment, the average tensile modulus of a hydrogel film is 76±0.5 MPa, which is several orders of magnitude higher than those of conventional polymer hydrogels with similar water content (usually in the range of 0.01 to 10 kPa). The ultimate tensile stress is 1.1±0.2 MPa, comparable to that of the polymer hydrogels containing a high content of clay.

Figure 3:
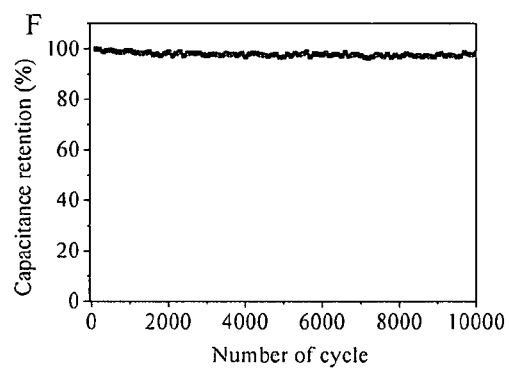
FIG. 3 is a graph showing the cycling performance of a hydrogel film based supercapacitor at a charge/discharge current of 100 A/g.
Figure 4:
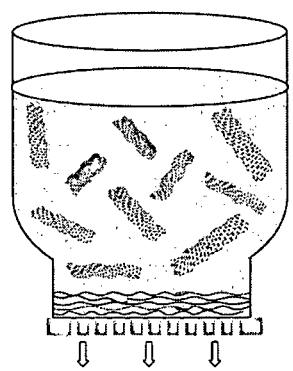
FIG. 4 is a schematic diagram showing a method of preparing a gel film under vacuum filtration.

In advantageous embodiments, the gel film can withstand bending and rather, vigorous mechanical agitation. Furthermore, advantageously the gel is stable under repetitive cycling of charge/discharge. As shown in FIG. 3, in one embodiment the hydrogel can maintain over 97%, preferably 99% of capacitance over 10,000 cycles, even under a high loading current of 100 A/g.

The gel film can be prepared by any means that causes the graphene sheets to arrange, as described, into the interconnected matrix. In the method of the invention, a liquid dispersion medium comprising the sheets forms a gel on a surface. The sheets self-assemble or self-orientate on the surface to form the conductive gel film illustrated schematically in FIG. 1.

For example the sheet liquid dispersion can have a concentration in the range of from about 0.1 mg/ml to about 1 mg/ml, such as from about 0.2 mg/ml to about 0.8 mg/ml or 0.4 mg/ml to about 0.6 mg/ml. The volume of the liquid dispersion used will have an effect upon the thickness of the graphene gel film formed.

During forming of the gel film, the sheet liquid dispersion is subjected to an increase in temperature. The increase in temperature involves heating the sheet liquid dispersion above room temperature. The increase in temperature can be performed prior to forming a gel film from the dispersion.

The heat can be provided to the dispersion by any means. In one embodiment, the heat is provided by immersing a container containing the sheet liquid dispersion in a water bath. In another embodiment, the heat is provided by placing a container containing the sheet liquid dispersion in an oven. The heat can also be provided by an autoclave. For example, the temperature of the sheet liquid dispersion is increased to at or at least about 90° C., 95° C., 100° C., 120° C., 130° C., 140° C., 150° C. or 180° C. The sheet liquid dispersion is held at the selected temperature for a period of time. In one embodiment, the period of time is sufficient to cause a change in the structure of the graphene sheets. For example, the period of time is about 30 mins, 1, 2, 3, 5 or 8 hours.

Following the increase in temperature, the dispersion can be allowed to cool. The liquid having the graphene sheets dispersed therein can then be applied to the surface on which the gel forms by any suitable means, including being poured, pumped or drawn under vacuum. In one embodiment, the temperature of the sheet liquid dispersion is increased at the same time as the liquid is applied to the surface.

For example, excess dispersion medium can be removed by evaporation, under vacuum or by physical separation, such as by filtration. For example, a liquid dispersion can be applied to a surface and heated or exposed to vacuum drying to remove excess dispersion medium and give rise to the formation of the gel on the surface. In one preferred embodiment, the removal of dispersion medium is performed by passage through a filter, optionally under vacuum. In this case the porosity of the filter surface to which the liquid is applied must be carefully selected such that pore size will not allow substantial passage of the sheets.

A liquid having sheets dispersed therein, and optionally including other components as mentioned above can be passed through the filter, which results in a layered, self-assembled structured gel on the filter paper. The self-assembly involves the sheets self-stacking in a face-to-face manner to form an oriented, highly porous yet mechanically robust gel film. The resultant gel film comprises individual sheets that work cooperatively to allow the high specific surface area, excellent mechanical strength and electrical conductivity of the gel.

As liquid is removed, gelation occurs at the interface between the dispersion and the solid surface e.g. the filter membrane. This is evidenced by the fact that the graphene dispersion does not get more concentrated as the liquid is drained out by filtration, suggesting that the graphene sheets are continuously deposited on the filter membrane, apparently in a sheet-by-sheet fashion.

Filtration is complete when excess dispersion medium has passed through the filter. The as-formed gel is a "wet" film of gel. The gel can be isolated from the filter by separation using, such as by using a blade, tweezers or a mechanical separation device.

Figure 5:
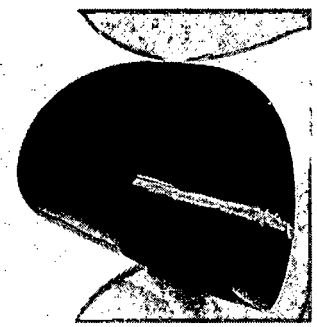
FIG. 5 is a photograph of a free-standing flexible hydrogel film formed by vacuum filtration of a graphene dispersion.

In order to effectively isolate or separate the gel from the surface of the filter, it should be sufficiently thick so it can be handled without undue damage or degradation. For example, the gel may be at least about 20 μm, 40 μm, 50 μm, 60 μm, 80 μm or 100 μm in thickness. In one preferred embodiment the gel is about 65 μm in thickness. An isolated gel according to one embodiment of the invention is shown in FIG. 5.

Gel films that have a thickness of less than about 20 μm, 10 μm, 500 nm, 10 nm, 5 nm or 2 nm may be unstable without the surface of the substrate as support. These thin films can be used without being separated from the surface, i.e. the gel film and the substrate on which it formed are used together, for example, in a device.

It should be understood that gel films of any thickness can be retained on the surface if desired. In some embodiments, the gel is retained on a surface which is itself conductive, thereby increasing the overall conductivity of the gel material formed. In some embodiments, the surface is modified to increase its conductivity before contacting it with the liquid dispersion. A layer of a conductive material can be applied to the surface so that the substrate on which the gel forms can be used as an electrode. The conductive layer can be formed from any material known for use in an electrode, such as gold, silver, platinum, palladium, or tin. The conductive material can be applied to the surface of the substrate by any means as would be appreciated by the person skilled in this technology area, for example, by vacuum deposition or sputtering.

In another embodiment, the surface of the gel film (together with or separated from the surface of the substrate) can be modified once the gel film has formed to include a conductive layer. The conductive layer can be any material known for use in an electrode, such as gold, silver, platinum, palladium or tin. In one embodiment, the conductive layer comprises a conductive polymer. The conductive polymer can be anion inserting (p-type) or cation inserting (n-type) polymer. For example, the conductive polymer can be a p-type polymer selected from the group: oxidized polyacetylene, poly(p-phenylene), polyacene, polyperinaphthalene, poly(phenylene vinylene), poly(thienylene vinylene), poly (furylene vinylene) polyazulene, polynaphthalene, poly (phenylene sulfide), poly(phenylene oxide), polyphenothiazine, polyaniline, polypyrrole, polythiophene, polythianthrene and polyisothianaphthene and substituted versions thereof. Suitable cation inserting (n-type) polymers include poly(p-phenylene), polyacetylene, poly(p-phenylene vinylene) and poly(phenylquinoline).

The conductive polymer can be formed on the surface of the gel film by any suitable means. For example, the conductive polymer can be poured, sprayed or condensed onto or over the gel to coat the surface. In one embodiment, the gel film is immersed in a solution of monomers of the polymeric material. The monomers can be subjected to conditions which cause then to polymerise in situ thereby coating the surface of the gel film.

While the conductive polymer is referred to as a "layer", the resultant structure can comprise about 30, 40, 50, 60 or 70 wt % of the conductive polymer. Thus, the resultant gel film together with the conductive polymer can be referred to as a hybrid gel film.

The gel can act as a scaffold to form a mechanically strong, anisotropic, thin functional gel that may otherwise be difficult to form. Thus, in one embodiment, the gel acts a scaffold for the formation of a hybrid gel film. The hybrid gel film can comprise, for example, an organic molecule, a polymer, a biomolecule, inorganic or metal nanoparticles and/or an inorganic oxide which can also be nanoparticulate.

The gel film scaffold can be immersed in the new material for incorporation into or onto the gel film to form the hybrid. Alternatively, the new material can be poured, sprayed or condensed onto or over the gel. In one embodiment, the new material is formed in situ through chemical deposition. For example, the hybrid gel film can comprise about 30, 40, 50, 60 or 70 wt % of the new material. The new material can be absorbed into the gel to improve the properties of the gel. The properties that can be improved include durability, aesthetic, mechanical strength and conductivity.

In one embodiment, the gel film acts as a scaffold for the formation of a conductive polymer gel film, for example, polyaniline. A list of other possible conductive polymers is given above. The conductive polymer can be formed in situ from monomers of the polymer. In another embodiment, inorganic oxide such as NiO and/or $SnO_2$ nanoparticles are grown through in situ chemical deposition on and in the gel film to from an oxide gel. Polyethylene glycol can be absorbed into the gel to form a hybrid gel with improved mechanical strength.

The isolated gel or gel together with the substrate on which it has formed can be stored in a liquid prior to use. The storage liquid is preferably the dispersion medium.

If the gel is isolated from the surface this is done before any subsequent drying step is conducted. A drying step will remove further dispersion medium from the gel. Excess drying should be avoided as it will result in disruption of the gel structure of the film.

Some characterisation of the gel requires that the film be dried for study. Freeze-drying is most advantageous because it reduces the effects of surface tension, so the lateral size of the film remains almost the same. In some embodiments, following freeze drying, little shrinkage is observed in the lateral dimension, but the thickness of the film is reduced to about 4.6% of the thickness.

In preferred embodiments the gel film is substantially free from surfactants or polymer binders, so that if desired the sheets can readily interact with dissolved molecules in the gel structure. The addition of binders e.g. polytetrafluoroethylene (PTFE) may add extra weight to a device comprising the gel, may block a portion of surface area of sheets and reduce conductivity. Accordingly, the gel film of the invention is in one embodiment stabilised by the sheets only, to the exclusion of other polymeric additives. There may be polymers incorporated into the interconnected matrix provided these do not disrupt the ability of the graphene sheets to overlap to form the electrically conductive matrix.

The liquid in the gel can be exchanged for a different liquid once the gel has formed. In some embodiments, the different liquid is poured, sprayed or condensed onto or over the gel to allow for the exchange. In one embodiment, the liquid in the gel can be vacuum evaporated in the presence of the different liquid to allow for the exchange. In one embodiment, the gel is immersed in the different liquid for a period of time. The period of time to which the gel is exposed to the different liquid can be selected to result in complete or partial infiltration of the different liquid in the gel.

In one embodiment the different liquid is an ionic liquid. The liquid in the gel is advantageously vacuum evaporated in the presence of the ionic liquid to allow for complete infiltration of the ionic liquid into the gel. Suitable ionic liquids include 1-butyl-3-methylimidazolium hexafluorophosphate, 1-hexyl-3-methylimidazolium hexafluorophosphate, 1-octyl-3-methylimidazolium hexafluorophosphate, 1-decyl-3-methylimidazolium hexafluorophosphate, 1-dodecyl-3-methylimidazolium hexafluoro phosphate, 1-ethyl-3-methyl-imidazolium-trifluorosulfonate, 1-butyl-3-methyl-imidazolium-trifluorosulfonate, 1-ethyl-3-methylimidazolium bis((trifluoromethyl)sulphonyl)-imidate. 1-hexyl-3-methylimidazolium bis((trifluoromethyl)sulphonyl)amide, 1-ethyl-3-methyl-imidazolium-trifluoroacetate, 1-butyl-3-methyl-imidazolium-trifluoroacetate, 1-ethyl-3-methyl-imidazolium-tetrafluoroborate, 1-hexylpyridinium tetrafluoroborate, 1-octylpyridinium tetrafluoroborate, 1-butyl-3-methylimidazolium tetrafluoroborate, 1-methyl-3-ethyl imidazolium chloride, 1-ethyl-3-butyl imidazolium chloride, 1-methyl-3-butyl imidazolium chloride, 1-methyl-3-butyl imidazolium bromide, 1-octyl-3-methyl-imidazolium-bromide, 1-methyl-3-propyl imidazolium chloride, 1-methyl-3-hexyl imidazolium chloride, 1-methyl-3-octyl imidazolium chloride, 1-methyl-3-decyl imidazolium chloride, 1-methyl-3-dodecyl imidazolium chloride, 1-methyl-3-hexadecyl imidazolium chloride, 1-methyl-3-octadecyl imidazolium chloride, 1-methyl-3-octadecyl imidazolium chloride, ethyl pyridinium bromide, ethyl pyridinium chloride, ethylene pyridinium dibromide, ethylene pyridinium dichloride, butyl pyridinium chloride, benzyl pyridinium bromide, and mixtures thereof.

Other additives such as nanoparticles, polymers or other molecules or agents (as mentioned above) can be added to the gel once formed. Composites of graphene and additives have been reported per se, but these usually involve the coating/mixing of graphene sheets with the additives before being assembled into a bulk structure. Individual graphene sheets are generally separated by the additive(s), therefore the conductivity of the resulting composite can be adversely affected. By incorporating the additives into the gel once the gel has formed, there can be facilitation of charge transfer from the additive(s) to graphene and ultimately any outer electrical circuits. The additives can be in the voids between the graphene sheets, and/or may be disposed on the surfaces of graphene sheets themselves.

In order to incorporate one or more additives into the gel after it has formed the gel is brought into contact with the additive(s). The or each additive can be injected directly into the gel using e.g. a needle or some other penetrating device/ Alternatively, the additive can be allowed to infiltrate into the gel over a period of time. In some embodiments, a solution comprising the additive(s) or a liquid additive is poured, sprayed or condensed onto or over the gel to allow infiltration. In another embodiment, the gel is immersed into a solution comprising the additive(s) or a liquid additive for a period of time to allow the dispersion medium in the gel to equilibrate with the solution or liquid. Solid additives such as oxide/metal nanoparticles or conducting polymers can be formed by in-situ precipitation reaction, electro-reduction and polymerisation. The skilled person will appreciate that the concentration of the additive to which the gel is exposed can be selected or controlled in order to alter the resultant concentration of the additive in the gel. The period of time to which the gel is exposed to the additive can also be selected to result in a desired concentration of the additive in the gel.

In one embodiment, the gel film of the invention can include a drug therein. The drug can be a liquid used to form the gel or it can be dissolved in the liquid used to prepare the gel. Alternatively, the drug can be incorporated into the gel once it has formed as described above. The drug can be dispersed in the gel or it can be associated with the graphene sheets. The association can be a chemical bond between the drug and the sheets, or electrostatic attraction between the drug and the sheets. Accordingly, the gel film of the invention can be used as a drug carrier for controlled release and/or drug delivery. In some embodiments, the drug release could be effected by electric impulse providing electro-stimulated drug release.

Once isolated, the conductive gel film could be used in a variety of other applications including in a number of devices. The device could be a biomedical device including a biosensor. Furthermore, for example, the gel could be used as an electrode for energy storage and conversion devices including, supercapacitors, batteries, fuel cells, solar cells and actuators including a pH sensitive actuator.

The increase in temperature applied to the dispersion during preparation of the gel film has tin effect on the resultant structure of the gel film. This phenomenon can be manipulated to result in a gel film tuned for a specific application. For example, since the inter-sheet spacing within the gel film can be controlled by changing the temperature, the gel film can be tuned as a filter.

Specifically, is thought that the CCG sheets become more corrugated the higher the temperature to which they are exposed during preparation of the gel. Evidence for this is that the water permeation rate of the gel film increases with an increase in the thermal treatment temperature of the CCG dispersion. This is shown graphically in FIG. 5B (experimental details are given in Example 4D). Tests with other liquids such as ethanol and toluene give the same flux trend as for water.

ARM and scanning electron microscope (SEM) data also indicate that the CCG sheets in a gel film are more corrugated when exposed to higher treatment temperatures during preparation of the gel films. It is therefore believed that thermal fluctuation is the origin of the intrinsic corrugation of the graphene sheets. It is thought that thermally generated strain induces corrugation in pristine graphene sheets.

By controlling the increase in the temperature of the graphene or CCG dispersion during preparation of the gel film, the extent of corrugation in the graphene sheets in the film can be controlled. The open channels or pores within the gel are larger the higher the treatment temperature. The "channels or pores" are formed by the interstitial spacing between the sheets and are filled with dispersion medium. The channels or pores allow for passage of molecules from one side of the gel film to the other, opposite side of the gel film. In other words there is a continuous porous structure or nanochannels. The channels or pores are shown schematically in FIG. 5A.

It has been found that increasing the temperature of the dispersion to about 90° C. during preparation of the gel results in an average channel or pore size of less than 3 nm. This is evidenced by the fact that particles having a diameter of about 3 nm are unable to pass through the gel film. If the temperature is increased to in the range of about 95° C. to about 120° C., the average channel or pore size increases to above about 3 nm but less than about 13 nm. This is evidenced by the fact that particles having an average diameter of about 3 nm are able to pass through the gel film, but particles having an average diameter of about 13 nm are unable to pass through the film. It can therefore be seen that the gel film of the invention could also be used as a filtration membrane for nanoparticle or molecule separation.

If the temperature is increased to about 150° C. the gel film will permit passage of 13 nm particles indicating that the pore size has further increased from the films described above. The temperature during formation of the gel film can be selected to result in a gel film that has an inter-sheet spacing that permits passage of molecules having a first average diameter in favour of molecules having an average diameter larger than the first average diameter.

In recent years, nanofiltration has received increasing attention as a cost and energy effective technique for water purification and food processing. Carbon nanotube arrays have been previously proposed as a promising material towards this application. However, the difficulty in low-cost processing of size-tuneable carbon nanotube membranes has limited the development of carbon nanotube-based separation membranes. The gel film of the present invention provides a nanofiltration film with pore sizes tuneable at the nanometer scale and which can be simply prepared. The surface of the CCG sheets can be readily functionalized using well-known carbon surface chemistry. This feature, together with the ease of synthesis, makes CCG-based films an alternative class of separation membranes.

The combination of a highly open pore structure, structural/chemical stability, a flexible thin film form and ease of synthesis also makes the gel film of the invention attractive for use as a catalyst support or as a superabsorbent for water purification.

The gel film also has the potential to be a unique experimental platform for future research on the electronic properties of graphene assemblies, pseudo-2D nanofluidics, nanoscale confinement effects and fundamental surface/interface phenomena of carbon materials. Furthermore, other functional materials can be grown on the graphene sheets or in the void regions in the gel structure via solution-phase chemical/physical deposition. Thus the gel film could be used as a conductive tissue scaffold for cell growth, and/or could also serve as a versatile matrix for fabricating new exciting functional nanohybrids.

Embodiments of the invention will now be described with reference to the following non-limiting examples.

EXAMPLES

Example 1—Preparation of Graphene Sheets

Example 1A—Preparation Step

Graphite oxide (GO) was synthesized from natural graphite (SP-1, Bay Carbon) by a modified Hummers method (Hummers, W. S., Offeman, R. E., Preparation of Graphitic Oxide *J. Am. Chem. Soc.* (1958) 80 1339). As-synthesized graphite oxide was suspended in water to give a brown dispersion, which was subjected to dialysis to completely remove residual salts and acids. Ultrapure Milli-Q® water was used in all experiments. As-purified graphite oxide suspensions were then dispersed in water to create a 0.05 wt % dispersion. Exfoliation of graphite oxide to graphene oxide was achieved by ultrasonication of the dispersion using a Brandson Digital Sonifier (S450D, 500 W, 30% amplitude) for 30 min. The obtained brown dispersion was then subjected to 30 min of centrifugation at 3000 RPM to remove any unexfoliated graphite oxide (usually present in a very small amount) using an Eppendorf 5702 centrifuge with a rotor radius of 14 cm. In a typical procedure for chemical conversion of graphite oxide to graphene, the resulting homogeneous dispersion (5.0 mL) was mixed with 5.0 mL of water, 5.0 μL of hydrazine solution (35 wt % in water, Aldrich) and 35.0 mL of ammonia solution (28 wt % in water, Crown Scientific) in a 20 mL-glass vial. The weight ratio of hydrazine to GO was about 7:10. After being vigorously shaken or stirred for a few minutes, the vial was subjected to a thermal treatment as detailed in Example 1B.

The lateral sheet sizes of the obtained chemically converted graphene (CCG) sheets ranged from a few hundred manometers to 1 μm.

Example 1B—Thermal Treatment

During the preparation of the gel, the temperature of the CCG dispersion is elevated. Separate vials of the CCG dispersions, prepared according to Example 1A, were placed in a water bath or an autoclave. The water bath subjected each dispersion to temperatures of 90° C., 95° C. or 100° C. The autoclave subjected the dispersion to 120° C., 150° C. or 180° C. The heat treatments were performed for at least 1 or at least 3 hours.

Example 2—Preparation of the Hydrogel

To prepare a gel film, CCG prepared in Example 1 was dispersed in water to a concentration of 0.37 mg/ml. The liquid comprising graphene sheets dispersed therein was filtered through a mixed cellulose esters filter membrane (47 mm in diameter, 0.05 μm pore size, Millipore) by vacuum suction.

Figure 6:
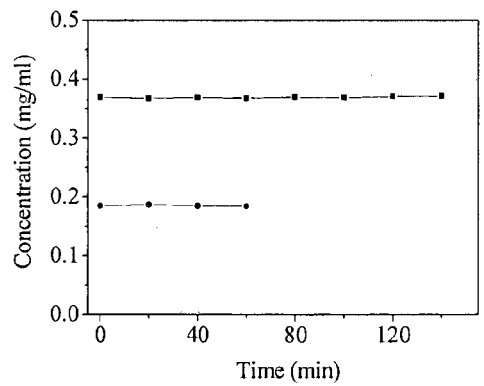
FIG. 6 are graphs showing the concentration of a liquid comprising a graphene dispersion versus filtration time.

During the vacuum filtration, a uniform layer of black CCG was immediately formed on the filter membrane. The concentration of the CCG dispersion during the filtration process was studied and it was found that the concentration of CCG remains constant during the filtration-process. The graphs in FIG. 6 show that the filtration took about 150 min for 24 ml of a 0.37 mg/ml solution and 60 min for 24 ml of a 0.18 mg/ml solution. The concentrations of the dispersion solution were monitored using UV-Vis spectroscopy which indicated that he CCG solution does not become concentrated when the water is filtered out, which is slightly different from the formation of graphene oxide paper prepared using the similar filtration method. This also indicates that the gelation only takes place at the solid/liquid interface during the filtration. This result is also consistent with the SEM analysis, which reveals a layered structure across the entire cross-section of the freeze-dried gel film. If the gelation had occurred in the solution, at least the top layer of the film would give a 3D cross-linked structure.

The filtration was finished when there was no visible CCG dispersion left on the filter membrane. Relatively thick films (65 μm) were carefully peeled off from the filter membrane using tweezers. The resultant gel film was immediately transferred to a Petri dish and immersed in water overnight to remove the remaining ammonia and unreacted hydrazine. The films were stored in water prior to use and were cut into required sizes for various tests using scissors. The content of graphene in each film was determined by weighing the samples dried in air at 100° C. for 12 h. The graphene content was found to be about 0.45 mg/cm$^2$.

Example 3—Methods

For the volumetric pH responsive experiments, the hydrogel samples obtained from Example 2 were soaked in aqueous solutions of different pH values for 1 day prior to the thickness measurement. The pH was adjusted by $H_2SO_4$ (pH 1 to 6) and NaOH (pH 8-11), respectively. The thickness of the films was tested using a digital micrometer caliper.

Figure 7:
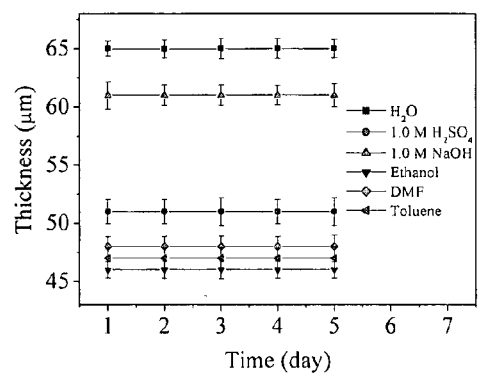
FIG. 7 is a graph showing the thicknesses of gel films in different solutions as a function of storage time.

To test the stability of the films in various chemical environments, the films of 0.45 mg/cm$^2$ were immersed in $H_2O$, 1.0 M $H_2SO_4$, 1.0 M NaOH, ethanol, N,N-dimethylformamide (DMF) and toluene. For toluene, the film was first exchanged with ethanol and then immersed into toluene. As shown in FIG. 7, the lateral size of the films did not change in different liquids. The thickness varied with the type of liquids but remained constant over time if stored in the same liquid.

Figure 8:
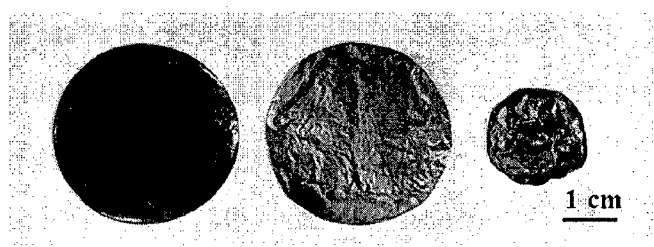
FIG. 8 is a series of photographs of gel films containing 0.45 mg/cm$^2$ of CCG. (Left) as-prepared gel; (middle) gel after being freeze-dried; and (right) gel after being freely dried in air at room temperature.

Some characterisation requires that the film be dried for study. It has been found that the drying methods have a significant effect on the morphology of the dried film. As shown in FIG. 8, if a free-standing wet film prepared in Example 2 was dried in air, it becomes shrunk and crumpled. However, if it is freeze-dried to reduce the effect of surface tension, the lateral size of the film almost remains the same and the film gives a lustrous appearance, similar to those dried on the filter paper under continued vacuum purge. Following freeze drying, little shrinkage was observed in the lateral dimension, but the thickness of the film was reduced to about 4.6% of the hydrogel thickness.

The XRD patterns were recorded on a Philips 1130 X-ray diffractometer (40 kV, 25 mA, Cu Kα radiation, λ=1.5418 Å) at room temperature. The data were collected from 2° to 70° with the scan rate of 27 min and steps of 0.02°. SEM images were obtained using a JEOL JSM 7001F Scanning Electron Microscope.

Example 4—Structure of the Hydrogel Film

Example 4A—A Comparative 3D Gel

The gelation of CCG can occur in solution when the concentration of graphene oxide exceeds 0.5 mg/ml. After gelation occurs, a large black aggregate is formed and is suspended in the solution. SEM analysis on the freeze-dried sample reveals a porous 3D network. Due to the fact that the sheets are three-dimensionally restricted and the CCG itself is rigid, its volume is much less sensitive to pH, compared to the gel film of the present invention.

Example 4B—Proposed Structure of the Graphene Sheets in the Gel

Scanning electron microscope (SEM) analysis on the freeze-dried sample revealed a layered structure. For the freeze-dried sample, a rather weak X-ray diffraction (XRD) peak appeared at around 22.7° C. of 2θ, corresponding to a d-spacing of 0.39 nm, very close to the d-spacing of graphite (0.34 nm). This indicates that the face-to-face packed graphene sheets in the dried Film are partially crystallized into a dense graphite-like structure. Given that the microstructure of a freeze-dried gel generally mimics that of its wet gel, it is reasonable to assume that graphene sheets in the hydrogel film are also arranged in a nearly parallel manner.

Interestingly, unlike the dried samples, the hydrogel film as formed in Example 2 gave no detectable XRD diffraction peak at 22.7° C. (or smaller angles). This result: in conjunction with the observation of its substantial reduction in thickness upon freeze-drying, evidences that the graphene sheets in the hydrogel film remain separated from one another.

Chemists have traditionally considered graphene as a flat molecule because from the chemistry point of view, the electrons in graphene are known to be $sp^2$-hybridised. The atomic force microscopy (AFM) analysis indeed indicates that the CCG sheets deposited on a silicon wafer are flat and the carbon atoms are densely packed. The morphology of the sheets on the wafer is very similar to that, of graphene prepared by mechanical cleavage of graphite. However, if the CCG sheets had taken a flat configuration in solution in the method described in Example 2, it should be impossible to complete the filtration. If the first layer of flat CCG sheets was totally flat on the filter membrane, it would immediately block the pores of the filter, prohibiting further filtration. Furthermore, the face-to-face assembling during the filtration would lead to a densely-stacked graphite-like structure due to the intersheet $\pi$-$\pi$ attractions, which would also discourage further filtration.

It has now been found that free-standing graphene sheets must not be perfectly flat at a finite temperature due to thermal fluctuation. To maintain its structural stability at a finite temperature, a free-standing graphene sheet must be corrugated to some extent, usually at the nanometer scale. Thus, it is proposed that the CCG sheets in solution are corrugated to some extent. Particularly, recent studies have shown that chemical and topological defects are present in CCG sheets and a small portion of carbon atoms in CCG are $sp^3$ hybridized. These defects would inevitably cause additional distortion to the flatness. When the corrugation of CCG is considered, the feasibility of filtration is well explained. When corrugated sheets are stacked together during formation of the gel, the inter-sheet contact area would be limited due to this corrugation and as a consequence of the high molecular stiffness of the sheet. Furthermore, carboxylic acid groups are know to exist on CCG and, when the hydrated CCG sheets come together, it is thought that the inter-sheet electrostatic repulsions caused by these negatively charged groups will become more predominant thereby preventing or at least reducing complete stacking. In addition to this, due to the presence of other hydrophilic groups on the CCG surface, water can be adsorbed on the CCG surface to induce repulsive hydration forces between the sheets. The formation of the graphene/water hybrid is therefore thought to be the result of a balance between repulsive forces and inter-sheet $\pi$-$\pi$ attractions.

Like many biological tissues, the hydrogel is metastable. If it is dried, the structure is not recoverable. Once the water is removed by drying, there is partial flattening and better stacking of the graphene sheets as evidenced by XRD analysis.

Example 4C—Estimation of the Pore Sizes and Accessible Surface Area of the Gel Films Methylene blue (MB) is a commonly-used dye probe for evaluating the surface area of graphitic materials. It is generally considered that each milligram of adsorbed MB represents 2.45 $m^2$ of surface area. Graphene films prepared in Example 2 (subjected to immersion in a water bath for 95° C. for 1 hour prior to preparation) were put into a MB solution in ethanol (0.15 mg/ml) and were left at 25° C. for 48 h to allow the accessible surface of the CCG sheets to be maximally covered by the MB molecules. The amount of the adsorbed MB was calculated from the change of the concentration of MB in the solution. The results are presented in Table 1 below.

TABLE 1

The surface area of the gel film and its dried samples measured by the methlylene blue adsorption method

|  | gel | Freeze-dried gel | Dried gel annealed @ 100° C. |
| --- | --- | --- | --- |
| Adsorption (mg ads./mg CCG) | 0.4436 | 0.2932 | 0.2431 |
| Surface areas ($m^2/g$) | 1086.8 | 718.3 | 595.8 |

As shown in Table 1, the specific surface area of the gel film is indeed reduced considerably after being freeze-dried and further annealed at 100° C. due to the stacking of the graphene sheets. Nevertheless, the reduction in surface area is not drastic. The thermally annealed sample still exhibits a high surface area of 595.8 $m^2/g$.

Example 4D—Estimation of the Accessible Surface Area of the Gel Films

Initial Experiments

Nanofiltration experiments were carried out to estimate the pore size of the resulting gel film following hydrothermal treatment at 95° C. for 1 hour. A thin film was first deposited on the filter membrane by filtration of 0.5 ml of a CCG solution (0.5 mg/ml). A citrate-stabilized aqueous solution comprising Ft nanoparticles of about 3 ran in diameter was prepared using the method reported in J. Turkevich, R. S. Miner. L. Babenkova. *Journal of Physical Chemistry* 90, 4765 (1986). The solution was poured onto the gel and the filtrate was collected. The Pt nanoparticles were detected in the filtrate.

Citrate-stabilized Au nanoparticles of about 15 nm in diameter were also tested, but no Au nanoparticles were found in the filtrate. All Au nanoparticles were retained on the gel film. This indicates that continuous nanochannels of greater than 3 nm but less than 15 nm existed in the gel, which was formed by the stacking of corrugated graphene sheets. This result also suggests that the amplitude of the corrugation of CCG sheets is approximately within this range.

Further Experiments

Figure 5A:
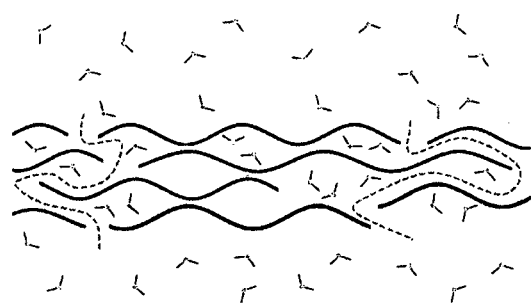
FIG. 5A is a schematic of water molecules flowing through a corrugated CCG gel film. The dashed line indicates possible water flow paths.
Figure 5B:
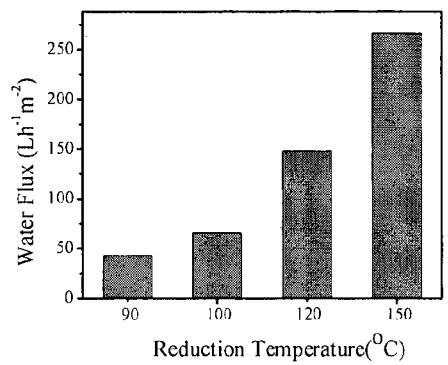
FIG. 5B is a graph showing water, fluxes of gel films prepared according, to embodiments of the invention. During preparation, samples of the dispersion medium were exposed to temperatures of 90° C., 100° C. 120° C. or 150° C.

Further experiments were undertaken with samples subjected to increases in temperature of about 90° C., 100° C., 120° C., 150° C. or 180° C. for 3 hours prior to formation of the gel film. Following the thermal treatments, the CCG membranes were prepared by vacuum filtration of 0.5 ml of CCG dispersions through polycarbonate filter membranes (47 mm in diameter, 0.2 µm pore size, Millipore). Once the filtration was completed (no free CCG dispersion was left on the filter but the membrane still remained wet), a certain amount of water or other solvent(s) was immediately poured on top of the as-formed CCG film, which was then subjected to continuous vacuum suction (with a pressure of around 1 bar) allow the water to flow through the membrane. The time for the water to drain was recorded to allow calculation of the average water flux for the CCG membranes. A schematic of the water flow is shown in FIG. 5A and the flux results are shown in FIG. 5B. As shown in FIG. 5B, the CCG membrane is permeable to water, as well as other liquids. The flux through the CCG membrane reflects the amplitude of the corrugation. The same amount of CCG was contained in each membrane.

Au nanoparticles and Pt nanoparticles were synthesized using known methods. 60 µM Pt nanoparticle colloids and 100 µM Au nanoparticle colloids were vacuum filtrated through the CCG membranes. The colloids of Au or Pt nanoparticles with average diameters of about 13 nm or 3 nm respectively were filtered through the gel film. The filtrated liquid was examined by UV-Vis (Cray 300, Varian) to confirm the rejection of nano-particles. The results are shown in Table 2 below.

TABLE 2

Nanoparticle rejection performance and estimated pore size of corrugated CCG membranes (X = rejected, ✓ = passed).

| | Pt NPs rejection | Au NPs rejection | Pore size |
|---|---|---|---|
| 90° C.-CCG | X | X | <3 nm |
| 100° C.-CCG | ✓ | X | 3~13 nm |
| 120° C.-CCG | ✓ | X | 3~13 nm |
| 150° C.-CCG | ✓ | ✓ | >13 nm |

The Au nanoparticles could pass through 150° C.-CCG films but were completely rejected by the 120° C.- and 100° C.- and 90° C.-CCG films. Pt nanoparticles were only rejected by 90° C.-membrane. Size exclusion test results indicate the presence of channels at or larger than 13 nm in 150° C.-CCG films. The channel size of 120° C.- and 100° C.-CCG films were found to have a pore size between 3 and 13 nm, whilst the 90° C.-CCG films has a pore size less than 3 nm.

Figure 5C:
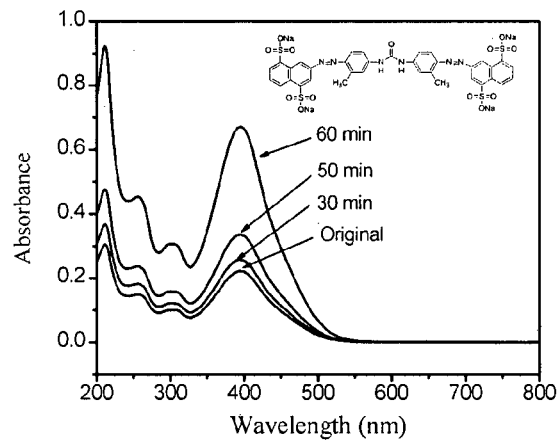
FIG. 5C is a graph showing the UV-Vis absorbance of a DY aqueous solution over time. The insert shows the molecular structure of DY.

To investigate sub-nanometer scale filtration, 50 ml of direct yellow (DY) (10 µM) solution was vacuum filtered through the gel film, and the top dye solution was tested by UV-Vis spectroscopy after a certain filtration time. The filtrate was examined after performing the filtration test to confirm the rejection rate. The results are shown in FIG. 5C. As shown in FIG. 5C, the concentration of DY in the solution increased gradually with the filtration time, indicating that the DY molecules were partially rejected by the membrane while water passed through. The rejection yield was calculated to be 67% for the 90° C.-CCG membrane. In contrast, the CCG membranes prepared at higher temperatures were unable to reject the dye molecule.

Example 4E—Tensile Mechanical Properties of the Films

Figures 9A, 9B:
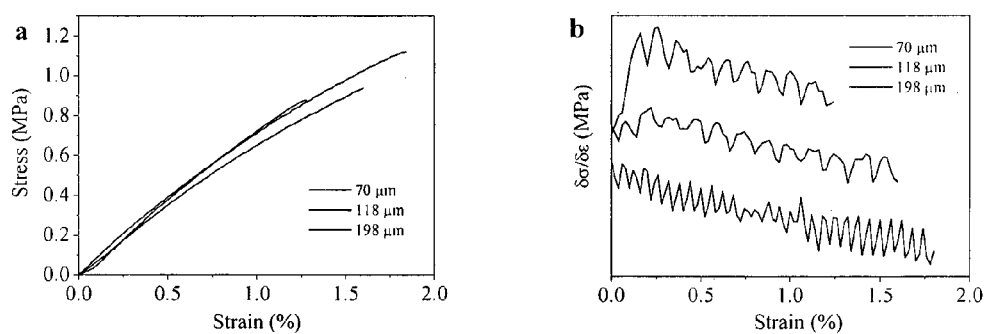
FIG. 9A is a graph showing typical stress-strain curves of gel films of different thicknesses; 9B is a graph showing the derivatives of the corresponding stress-strain curves of FIG. 9A.

Tensile measurements reveal that films with different thicknesses exhibit a similar tensile strength and stiffness (FIG. 9A). As with the mechanical behaviour of graphene oxide paper, the stress-strain curves of the gel films also display a "washboard" pattern (FIG. 9B), indicative of a slide-and-lock tensile mechanism. This structure, together with the trapped water, allows for a highly effective load distribution across the entire film when stressed, resulting in an excellent mechanical strength.

Example 5—Electrochemical Characterisation

Unlike 3D cross-linked hydrogels, the gel film shrinks substantially during dried. It is thus difficult to characterise the pore structure of the film using the traditional electron microscopy techniques. Given that the film is highly conductive and the electrochemical capacitance of a carbon material is strongly related to its pore structure, the pore structure can be characterised by comparing its electrochemical properties with those of the dried films.

As described in more detail below the electrochemical characterisation (FIG. 10) reveals that the gel film when used to prepare a gel-based supercapacitor displays extraordinary performance, even without any effort to optimize the device structure and without any other electroactive additives.

As shown in FIG. 11 both the cyclic voltammetry and galvanostatic charge/discharge tests suggest that all the graphene samples exhibit a high specific capacitance at a low charge/discharge rate. At a charge/discharge current of 0.1 A/g, the specific capacitances for the wet gel film, the freeze-dried gel film and the thermally annealed gel film (100° C. for 12 h) samples are 215 F/g, 158 F/g and 155 F/g, respectively, which are approximately proportional to their specific surface areas.

Figures 10A, 10B, 10C, 10D, 10E:
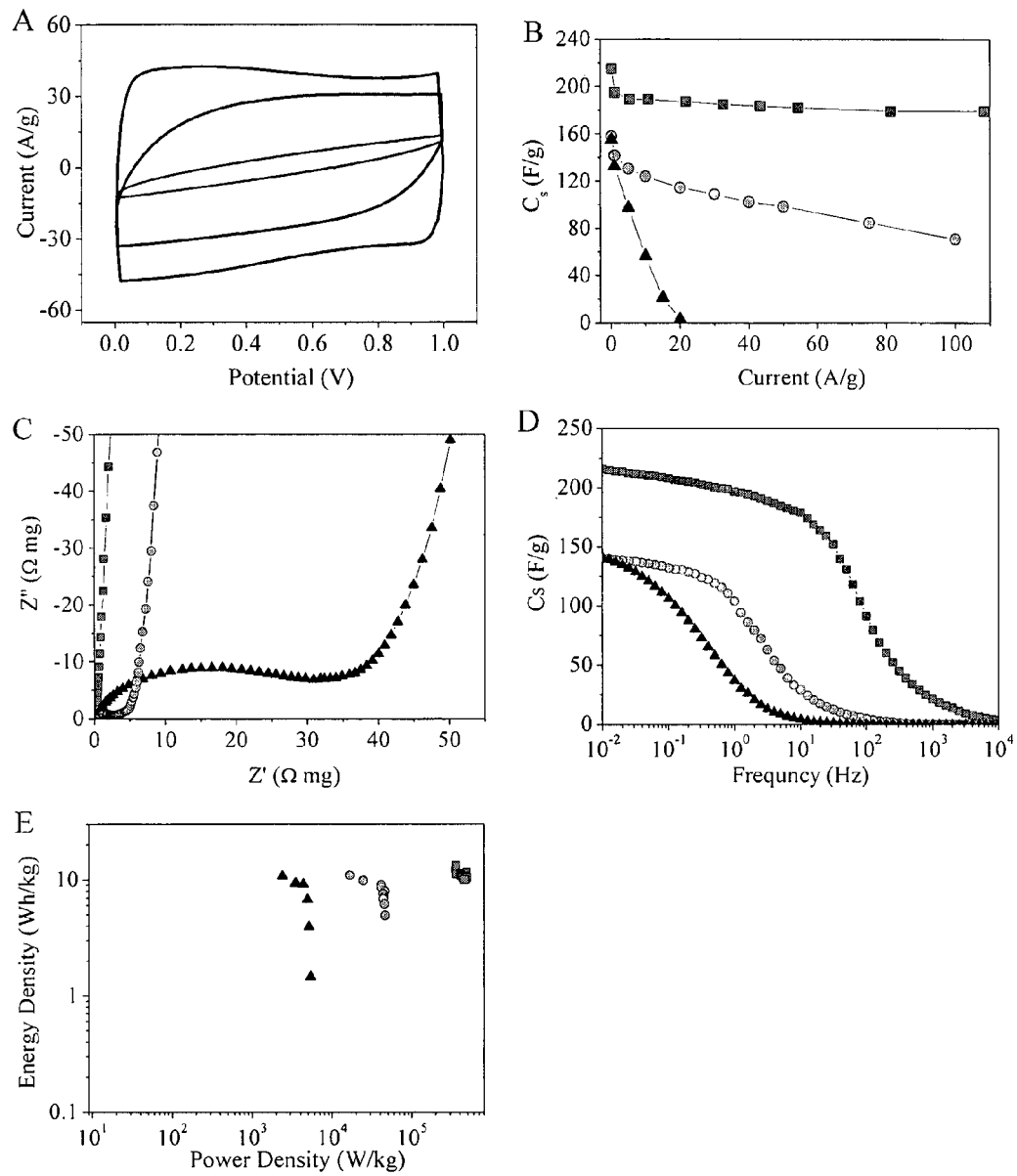
FIG. 10A to 10E are graphs showing the electrochemical characterisation of supercapacitors using gel films as electrodes and containing 0.45 mg/cm$^2$ of CCG with 1.0 M H$_2$SO$_4$ as electrolyte. (A) cyclic voltammograms obtained at a scan rate of 500 mV/s; (B) gravimetric capacitances measured at various charge/discharge currents, (C) Nyquist plots; (D) Bode plots of the frequency response of capacitance; (E) Ragone plots; The red, cyan and black curves represent the wet gel film, the freeze-dried gel and the thermally annealed gel (at 100° C. for 12 h).

However, the specific capacitance of the freeze-dried gel and particularly the thermally annealed sample drops substantially if the charge/discharge rate is increased (FIG. 10B). At a charge/discharge current of 100 A/g (FIG. 11E), the specific capacitances for the gel film and the freeze-dried are 180 F/g and 71 F/g, respectively. The thermally annealed sample gives almost no capacitance when the current exceeds 20 A/g. Graphene paper, dried under a vacuum, has also been tested and it has been found that its electrochemical performance is similar to that of the thermally annealed film. The substantial reduction of capacitance at an increased current density has been widely observed in the supercapacitors based on microporous carbon materials such as activated carbon. Because the diffusion of ions is greatly restricted in micropores, very small pores contribute little capacitance at a high charge/discharge rate.

Figure 12:
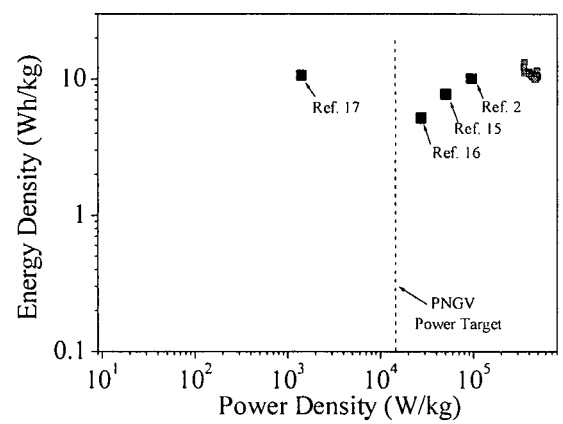
FIG. 12 is a Ragone plot showing that a gel-based supercapacitor out performs the reported data of other carbon materials including carbon nanotubes and porous graphitic materials and the power target of the PNGV (Partnership for a New Generation of Vehicles)

Given that all the graphene gels have the same chemical structure, the drastic discrepancy in electrochemical capacitance between the gel films and its dried counterparts can be ascribed to their difference in pore structure. As revealed by the SEM analysis, the pores (or channels) in the dried/thermally annealed samples are very small and therefore their capacitance is very sensitive to the value of the operation current. Because the volume of a gel film is approximately 20 times greater than its dried counterparts, the pore size in the gel film should be much bigger and therefore the diffusion of ions is much less restricted. This can indeed be confirmed by the Nyquist plots (FIG. 10C and FIG. 12). The slope of the 45° portion of the curve is called the Warburg impedance. The projected length of the Warburg-type line on the real axis characterises the ion diffusion process from solution into the inter-sheet of films. The Warburg-type line of the hydrogel-based supercapacitor is the shortest, suggesting the fastest ion diffusion in the gel film. The high-frequency intercept at the X axis in the Nyquist plot corresponds to the internal resistance of the supercapacitors, which determines the operation rate of a capacitor (power capability). As shown in FIG. 10C, the internal resistance of the "wet" gel is much less than that of the dried ones.

Bode plots of the frequency response of capacitance clearly show the significant influence of pore structures on the rate of ion transport (FIG. 10D). According to the literature, the operating frequency can be calculated as the frequency at which the capacitance is 50% of its maximum value. The operating frequency of gel, dried gel and dried annealed gel 100° C. are 75, 2.3 and 0.34 Hz, respectively, showing a difference in the frequency response of more than 2 orders of magnitude (FIG. 10D). This data corresponds to t=13.3, 434.8 and 2941.2 ms showing an almost 200 times difference in frequency response. Since all the films have the same compositions, we conclude that pore sizes are responsible for the observed phenomenon. Furthermore, the operating frequency of the gel film (75 Hz) is also superior to the microporous carbon with aligned pores (~10 Hz) and onion-like carbon (~38 Hz).

As demonstrated in FIG. 12, the power density for a hydrogel film according to one embodiment of the invention is at least twice higher than other carbon-based materials and nearly thirty times higher than the power target of the PNGV (Partnership for a New Generation of Vehicles), thus the hydrogel-based supercapacitors would be particularly useful as a power supply in electric vehicle systems. The energy and power observed at high rates are associated with the complexly distributed resistance and the tortuous diffusion pathways within the porous textures.

Figure 13:
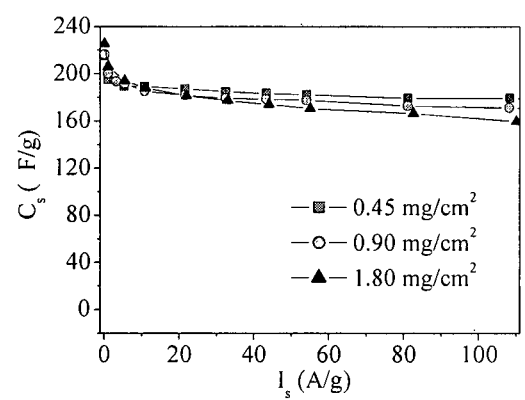
FIG. 13 is a graph showing the effect of the thickness of the gel films on the gravimetric capacitance of gel-based supercapacitors.

Additionally, unlike other carbon materials, the thickness of the gel film has little effect on the gravimetric capacitance (FIG. 13). All these results clearly suggest that the gel film has an unprecedented highly open and continuous pore structure.

Example 5A—Use of the Hydrogel Film in a Supercapacitor

To further characterise the pore structure and the surface accessibility of graphene sheets in the gel, hydrogel-based supercapacitors were fabricated. It is known that the performances of carbon materials as electrodes for supercapacitors are highly dependent on both the accessible specific surface area and the pore size.

Prototype supercapacitors using the graphene gel films prepared in Example 2 as electrodes were assembled into a symmetrical two-electrode configuration using a similar procedure to that reported in L. B. Hu et al., *Proc. Natl. Acad. Sci. USA*. 106, 21490 (2009).

To make the supercapacitor, two pieces of graphene containing gel films of the same size (~1 cm by 1 cm) were first attached on two Pt foils. At the end of the Pt foil, a platinum wire was clipped onto the film by a toothless alligator clip, which was then connected to a Versastat-400 potentiostat (Princeton Applied Research) for electrochemical characterisation. The overlapping parts were assembled with a filter paper sandwiched in between. The supercapacitors were wrapped with parafilm and then infiltrated with 1.0 M $H_2SO_4$ as the electrolyte solution. The galvanostatic charge-discharge tests were carried out between 0 and 1 V at current densities between 0.1 and 540 A/g, based on the mass of a single electrode (the net mass of the CCG contained in the gel film).

The specific capacitance was calculated using the following equation:

$$C_s = 2i/[-(\Delta V/\Delta t) \cdot m] = 2i/-(\text{slope} \cdot m)$$

where i is the current applied, the slope is that of the discharge curve after the iR drop, and m is the net mass of the CCG contained in the gel film (on one electrode).

Electrochemical impedance spectroscopy measurements were performed with a sinusoidal signal of 10 mV over the frequency range from 100 KHz to 10 mHz. The frequency-dependent specific capacitance was calculated according to:

$$C_s = 1/(\pi f Z'' m)$$

where f is the operating frequency, Z" is the imaginary part of the total device resistance, and m is the net mass of CCG contained in the gel film (on one electrode). The energy density of the electrodes was calculated as:

$$E = C_s \cdot V^2/4$$

where $C_s$ is specific capacitance of the electrode (F/g) calculated from charge-discharge tests at different current densities, V is the operating voltage (V). The power density of the electrodes was calculated by:

$$P = V^2/(8R \cdot m)$$

where V is the operating voltage, R is the internal resistance and m is the net mass of CCG film on one electrode.

The galvanostatic cycling test was carried out on a VMP2/Z multi-channel potentiostat/galvanostat (Princeton Applied Research).

The stress-strain curves were obtained on a dynamic mechanical thermal analyser (Rheometrics Mark IV DMTA). The samples were cut by scissors into 5 mm×15 mm rectangular strips. The gel strips were then gripped through a film tension clamp. Controlled strain rate mode was used to test the mechanical properties of gel. The strain ramp rate was 0.01%/s and the preload was 0.02 N.

To ascertain the origin of the exceptional performance of the hydrogel-based supercapacitor, a comparative supercapacitor was prepared using a dried hydrogel film for comparison.

As described herein, upon drying and thermally annealing, the hydrogel film undergoes a drastic shrinkage in volume, resulting in a significant reduction in surface area and particularly pore size. Like supercapacitors based on conventional activated carbon, the capacitances of the dried hydrogel films drop substantially when the charge current is increased (FIG. 10 and FIG. 11). The thermally annealed film shows almost no capacitance when the loading current exceeds 20 A/g. The electrochemical impedance analyses (FIGS. 10C and 10D) also suggest that the ions undergo much less diffusion resistance in the wet gel film (as prepared) than in the dried ones.

Figures 11A, 11B, 11C, 11D, 11E, 11F:
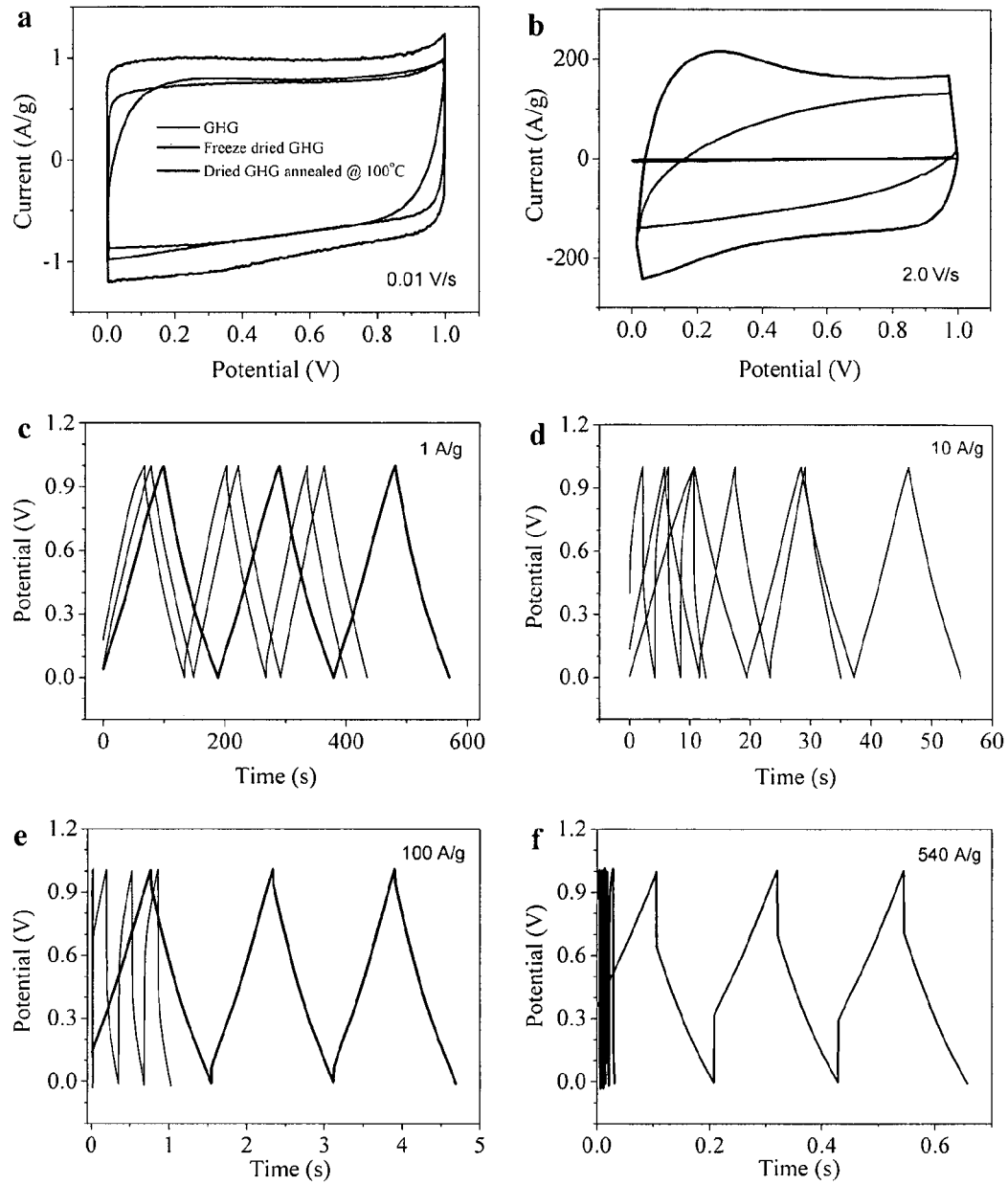
FIG. 11A to 11F are graphs showing additional electrochemical characterisation of the gel, freeze-dried gel and thermally annealed gel films (0.45 mg/cm$^2$). (A) CVs at a slow scan rate of 0.01 V/s; (B) CVs at an ultrafast scan rate of 2.0 V/s; (C to F) charge/discharge curves at various current densities: (C) 1 A/g, (D) 10 A/g, (E) 1.00 A/g and (F) 540 A/g. The red, cyan and black curves represent the wet gel, the freeze-dried gel and the thermally annealed gel (100° C. for 12 h).

The gel film containing 0.45 mg/cm² of CCG gives a specific capacitance of 215 F/g at a charge/discharge current of 0.1 A/g in an aqueous electrolyte, much higher than the value of CCG-powder. Of particular significance is that compared to other carbon materials including purposely engineered activated carbon containing large mesopores and the best performing carbon nanotubes, the specific capacitance and energy/power densities of the gel film are all much less dependent on the charge/discharge rates (FIG. 10). The gel can offer a much higher power density than other carbon materials. The cyclic voltammetry (CV) profile still retains a rectangular shape at an ultrafast scan rate of 2.0 to 10 V/s (FIG. 11B shows 2.0 V/s). A capacitance of 156.5 F/g can be obtained even when the supercapacitor is operated at an ultrafast discharge rate of 1080 A/g. Furthermore, a capacitance of 170 F/g can be obtained even if the supercapacitor is charged at 540 A/g (FIG. 11). This means that the capacitor can be charged/discharged to 80% of its full capacity within 0.1 second. There are no other carbon nanomaterials that can perform so well at such high operation rates. The excellent performances, in conjunction with its low-cost synthesis, make the graphene gel film highly promising for commercial use in energy storage devices.

Figure 14:
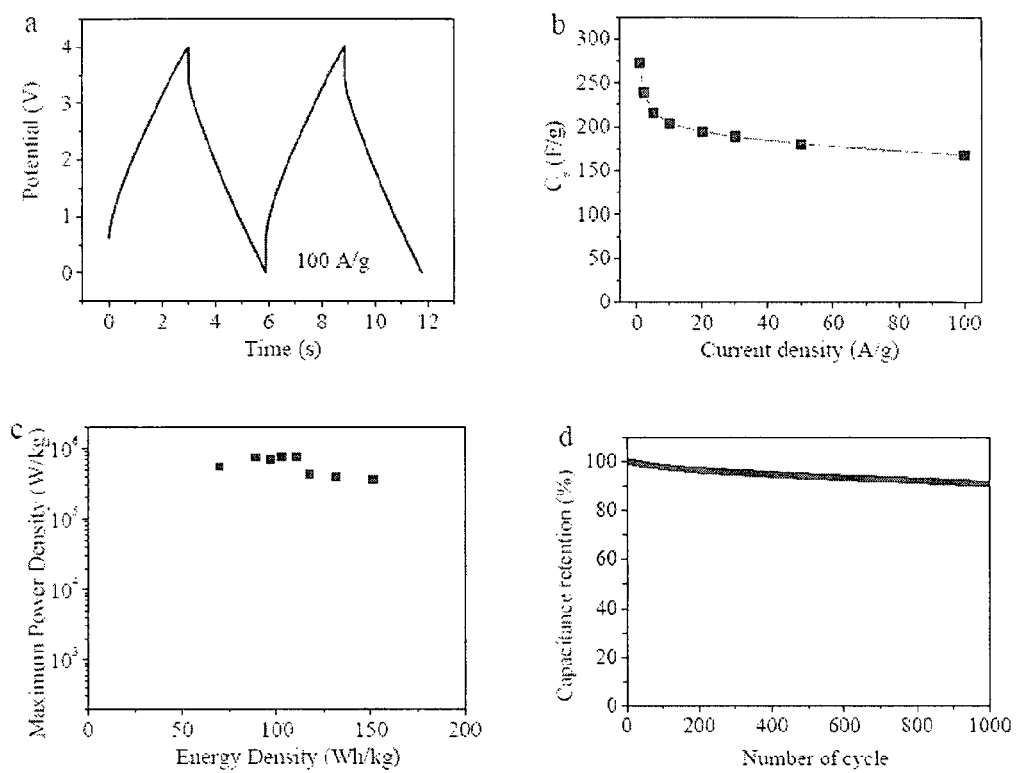
FIG. 14 Electrochemical characterisation of the supercapacitor based on $EMIMBF_4$-exchanged films. (A) Typical charge/discharge curves at the current density of 100 A/g; (B) gravimetric capacitances measured at various charge/discharge current densities; (C). Ragone plots; (D) the cycling performance at the charge/discharge current of 100 A/g.

The film can provide a powder density of 414.0 kW/kg at a discharge rate of 108 A/g which is one to three orders of magnitude higher than for its freeze dried/thermally annealed counterparts and other carbon materials. Table 3 below provide a comparison of the supercapacitor comprising the gel of the present invention (SHG) with literature data.

density up to 150.9 Wh/kg and 776.8 kW/kg-respectively. This energy data is comparable to lithium ion batteries (about 150 Wh/kg against the mass of the active materials in the electrode). However, the power density is much higher than for lithium batteries. FIG. 14 provides some key electrochemical data for the ionic liquid based supercapacitor.

The surface of the gel film can be modified with an electrically conductive layer to improve the supercapacitor. The electrically conductive layer can be a conductive polymer such as polyaniline (PANi). In order to form the conductive layer, a gel film was soaked in 10 mL of 1.0 M HCl aqueous solution containing 0.3 mL of aniline monomer at 0° C. for 12 hours. Following this, 10 mL of a 1.0 M HCl solution containing 0.18 g of ammonium peroxydisulfate (pre-cooled to 0° C.) was poured into the above solution and the mixture was shaken vigorously for 30 seconds. The mixture was then left, still, for a further 12 hours. The resulting films were thoroughly rinsed with water and then immersed in 0.5 M HCl for 0.5 hours. The deposition process was repeated to ensure a sufficient amount of PANS coated on the gel film surface. The film was found to contain 58.3 wt % of PANi.

Figure 15:
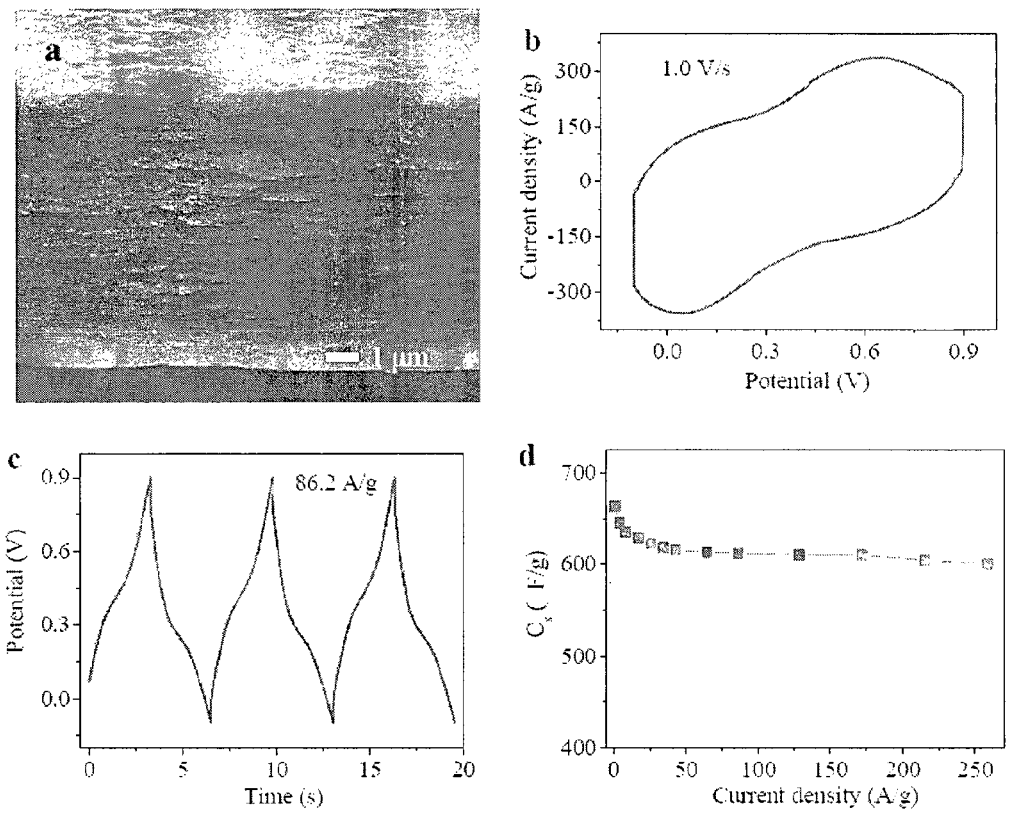
FIG. 15 (A) is an SEM image of a cross-section of a freeze dried PANi-coated gel film: (B) CV curve obtained at a scan rate of 1.0 V/s; (C) charge/discharge curve obtained at a current density of 86.2 A/g; and (D) gravimetric capacitances of the PANi-coated film measured at various charge/discharge currents.

FIG. 15 shows the structure and electrochemical performance of the PANi-coated gel film. The PANi-coated gel performs much better, in a supercapacitor than its dried counterpart and can be advantageously formed using the scaffold of the hydrogel film. The SEM image of the freeze dried PANi-coated film shows that the film shrank during the drying process. The thickness of the dried film is only 12.1%

TABLE 3

Reported performance data of representative supercapacitors with high power densities in aqueous electrolytes.

| Sample | Electrolyte (Potential range) | Capacitance (F./g) | Energy density (Wh/kg) | Power energy (kW/kg) | Ref. |
|---|---|---|---|---|---|
| ALG-C | 1M $H_2SO_4$ (1 V) | 198 (0.05 A/g) | 7.4 | 10 | 3 |
| HPGC | 6M KOH (1 V) | 270 (0.1 A/g) | 5.7 | 10 | 4 |
| CNTs/Au | 6M KOH (0.8 V) | 72 (2 A/g) | ~2.5* | 48 | 5 |
| SWNTs | 1M $H_3PO_4$ (1 V) | 120 (1 A/g) | 6 | 23 | 6 |
| SWNTs | 7M KOH (0.9 V) | 180 (1 mA/cm²) | 6.55 | 20 | 7 |
| SWNTs | 1M $H_2SO_4$ (1 V) | 200-100 | 3.5-7 | ~100 | 8 |
| Graphene | 5.5M KOH (1 V) | 135 | ~4.7* | N/A | 9 |
| Graphene | 30% KOH (1 V) | 205 (0.1 A/g) | 7.1 | 10 | 10 |
| | | 158.2 (0.1 A/g) | | | |
| Freeze dried SHG | 1M $H_2SO_4$ (1 V) | 124.0 (10 A/g) 70.8 (100 A/g) | 3.1~5.5 | 15.3~38.5 | This work |
| | $EMIMBF_4$ (4 V) | 196.2 (1 A/g) | 92.7 | 10.9 | |
| SHG | 1M $H_2SO_4$ (1 V) | 215.0 (0.1 A/g) 179.4 (108 A/g) 156.5 (1080 A/g) | 5.5~7.5 | 180.5~414.0 | This work |
| | $EMIMBF_4$ (4 V) | 264.7 (1 A/g) | 144.0 | 91.0 | |
| PANI/CNT | 0.5M $H_2SO_4$ (0.8 V) | 332 (1 A/g) | 7.1 | 2.2 | 11 |
| PANi/Activated carbon | 6M KOH (0.8 V) | 380 (1 mA/cm²) | 18 | 1.25 | 12 |
| PANi/Graphene | 1M $H_2SO_4$ (0.8 V) | 210 (0.3 A/g) | ~15.5* | ~4* | 13 |
| PANi@SHG | 1M $H_2SO_4$ (1 V) | 635.8 (8.62 A/g) | 21.6 | 186.4 | This work |

*These values were calculated from the discharge data provided in the corresponding references.

Improvements to the Supercapacitor

Figure 16:
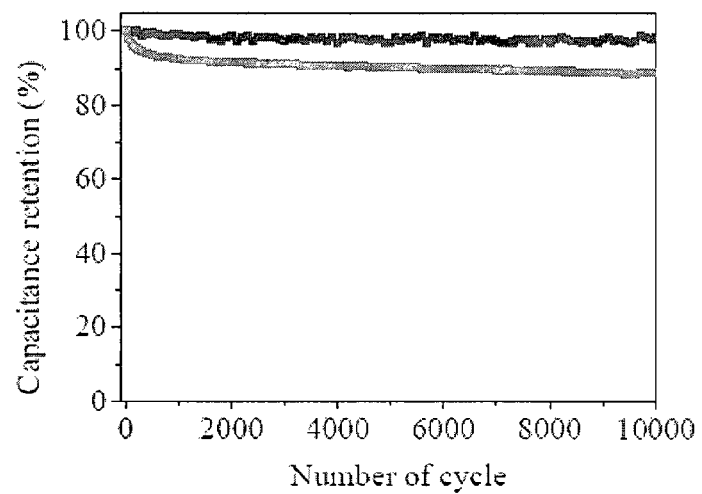
FIG. 16 is a graph showing the cycling performance of hydrogel film (top curve) and PANi-coated gel film (bottom curve) supercapacitors in 1.0 M aqueous $H_2SO_4$ electrolyte at a charge/discharge current of 108 A/g, and 86.2 A/g, respectively.

The water in the gel film can be exchanged for an ionic liquid (IL) in order to improve the performance of the supercapacitor. In order to exchange the water, the water was vacuum evaporated in the presence of 1-ethyl-3-methylimidazolium tetrafluoroborate ($EMIMBF_4$). The operation voltage for the supercapacitor was thus increased to 4 V (vs 1 V in aqueous electrolyte). At room temperature, the IL-exchanged supercapacitor can offer a specific capacitance of up to 273.1 F/g, an energy density and maximum power of it hydrated state, indicating that the film is highly porous in the hydrated state. FIG. 16 shows the cycling performance of a gel film in the absence of the conductive layer modification and of the PANi-coated gel film.

The invention claimed is:

1. A gel film, comprising sheets of graphene or chemically converted graphene at least partially separated by a dispersion medium and arranged in a substantially planar manner to form an electrically conductive matrix, wherein the gel film does not comprise a ceramic or an inorganic oxide particle.

2. The gel film according to claim 1, wherein the gel is an organogel.

3. The gel film according to claim 1, wherein the gel is a hydrogel.

4. The gel film according claim 3, consisting essentially of graphene or chemically converted graphene and water as the dispersion medium.

5. The gel film according to claim 1, wherein an available surface area of graphene or chemically converted graphene is at least about 1000 $m^2$/mg.

6. An article comprising the gel film according to claim 1, wherein the article is selected from the group consisting of:
  an electrode for an energy storage or conversion device selected from the group consisting of a supercapacitor, a battery, a fuel cell, a solar cell and an actuator;
  an electrode for an electrochemical sensor or for a resistive sensor;
  a filtration membrane for nanoparticle or molecule separation;
  a controlled drug release and/or delivery drug formulation comprising the gel film as a carrier;
  a conductive tissue scaffold for cell growth;
  a catalyst comprising the gel film as a support;
  an adsorbent for water purification and/or separation; and
  a materials component.

7. A hybrid gel film comprising the gel film according to claim 1, which is suitable as a scaffold.

8. The hybrid gel film according to claim 7, wherein the hybrid gel film comprises a material selected from the group consisting of an organic molecule, a polymer, a biomolecule, an inorganic nanoparticle, a metal nanoparticle, and an inorganic oxide particle.

9. A device, comprising the gel film according to claim 1.

10. The device according to claim 9, which is selected from the group consisting of a biomedical device, an electrode, a battery, a separation device, a sensor; and an actuator.

11. The device of claim 10, which is an electrode which is a superconductor.

12. An isolated gel film, comprising sheets of graphene or chemically converted graphene at least partially separated by a dispersion medium and arranged in a substantially planar manner to form an electrically conductive matrix, wherein the gel film does not comprise a ceramic or an inorganic oxide particle.

13. A method of producing a gel film, comprising:
  contacting a surface with a dispersion medium comprising sheets of graphene or chemically converted graphene dispersed therein;
  removing some of the dispersion medium from the surface and allowing the sheets to self-assemble to form a gel film on the surface,
  wherein the sheets of graphene or chemically converted graphene are at least partially separated by the dispersion medium and are arranged in a substantially planar manner to form an electrically conductive matrix and wherein the gel film does not comprise a ceramic or an inorganic oxide particle.

14. The method according to claim 13, further comprising:
  applying a conductive layer onto the surface before the contacting of the surface with the dispersion medium comprising sheets of graphene or chemically converted graphene dispersed therein.

15. The method according to claim 13, further comprising:
  separating the gel film from the surface.

16. The method according to claim 13, wherein the dispersion medium comprises one or more additives.

17. The method according to claim 15, further comprising:
  adding one or more additives to the gel film after the gel film has been separated from the surface.

18. The method according to claim 13, wherein:
  the surface is a filter; and
  the dispersion medium is removed from the surface by passage through the filter.

19. The method according to claim 18, wherein filtration occurs under vacuum.

20. The method according to claim 13, wherein the dispersion medium is water.

21. The method according to claim 13, wherein the dispersion medium is an organic liquid.

22. The method according to claim 13, wherein the dispersion medium comprises a drug.

23. The method according to claim 13, further comprising increasing a temperature of the dispersion medium, wherein the temperature is increased to control a resultant inter-sheet spacing in the gel film that forms on the surface.

24. The method according to claim 23, wherein the temperature is increased such that the gel film permits passage of particles having a first average diameter but does not permit passage of particles having a diameter larger than the first average diameter.

25. The method according to claim 23, wherein the temperature is increased to a range of about 90 to 150° C.

26. The method according to claim 23, wherein temperature of the dispersion medium is increased before the step of contacting the surface.

27. The method according to claim 26, wherein the dispersion medium is cooled before the step of contacting the surface.

28. A filtration membrane produced by the method according to claim 23.

* * * * *